3,697,466
POLYMER COMPOSITION
Charles I. Sullivan, Melrose, Mass., and Richard H. Cahill, Levittown, Pa., assignors to A. E. Staley Manufacturing Company, Decatur, Ill.
No Drawing. Continuation-in-part of application Ser. No. 579,847, Sept. 16, 1966. This application June 23, 1967, Ser. No. 648,243
Int. Cl. C08f 45/24, 45/52, 19/02
U.S. Cl. 260—29.6 TA                    16 Claims

ABSTRACT OF THE DISCLOSURE

A latex polymer of (A) at least one vinyl ester of a saturated aliphatic monocarboxylic acid, (B) at least one polymerizable monovinyl aromatic monomer and (C) at least one alpha,beta-ethylenically unsaturated acid in proportions such that monomers (A), (B) and (C) comprise at least 60 percent by weight of the polymer, 90 to 99.5% by weight of monomers (A), (B) and (C) are monomers (A) and (B) in a weight ratio of (A) to (B) in the range of 4:6 to 9:1 and correspondingly 0.5 to 10% by weight is monomer (C), preferably formed by polymerizing all of monomer (A) in a first step and all of monomer (B) in a second step, compositions containing said polymer and polyvalent metal salt, alkali-insoluble, alkali-dispersible polymer, suitable for clear wood coatings and/or floor polishes.

---

This application is a continuation-in-part of copending application Ser. No. 579,847, filed Sept. 16, 1966, now abandoned.

This invention relates to polymer emulsions capable of forming tough, abrasion-resistant, water-resistant films comprising a copolymer of a vinyl ester of a saturated aliphatic acid, monovinyl aromatic compound and an alpha, beta-ethylenically unsaturated acid and aqueous coating compositions comprising said polymer. More specifically this invention relates to an acidic polymer emulsion composition capable of forming at room temperature a tough, abrasion-resistant, water-resistant film comprising a polyvalent metal salt of an organic acid and a polymer of vinyl acetate, styrene and an alpha, beta-ethylenically unsaturated acid.

The use of melts and solutions of water-insoluble artificial resins in the coating and adhesive arts has been supplanted to a large extent by emulsions of such resins, particularly polyvinyl acetate and (meth)acrylate emulsions, due to the improved ease, economy and safety with which the aqueous emulsions of the resin may be employed. However, the usefulness of water-insoluble polymer emulsions has been limited to some extent by the characteristic lack of water-resistance of the coatings deposited therefrom and the tendency of such coatings to re-emulsify or water-spot when subsequently brought into contact with water during the course of normal use of the object or article to which they have been applied.

This lack of water-resistance has been considered innate in the coatings and films deposited from such polymer emulsions inasmuch as water-soluble emulsifying and bodying agents are required to establish and stabilize the emulsion. These agents are apparently carried into the film deposited from the emulsion upon application of the emulsion to a surface, and actively exhibit the emulsifying effect on the polymer comprising the body of the coating or the film and cause its redispersion when the surface is brought into contact with water.

Various proposals have been made to obviate the water-sensitivity of the coatings deposited from such emulsions, but in general, these proposals have been directed to modifying emulsions of such polymers which have been prepared in a specific manner, or require treating the emulsion with certain diluents. Due to the recognized tendency of the suggested diluents to break or gel the emulsion shortly after the addition of diluent, the diluents are added just prior to application of the emulsion.

Prior to this invention, for example, a common expedient for increasing the water-resistance of a coating or film deposited from a polyvinyl acetate polymer emulsion included the addition of a quantity of one or more substances such as dimethylol urea, trimethylol melamine, strong acids or highly reactive aldehydes such as glyoxal, certain resins and peroxides. In most instances, it was required that the substances be added to the polymer emulsion immediately prior to use as the resulting compositions were unstable and certain of the substances resulted in a progressive increase in the viscosity of the emulsion until a gel was formed. Additionally, the modification by some of these substances did not result in a substantial improvement in the water-resistance of the coating or film deposited from the emulsion and often imparted undesirable color and foaming characteristics to the emulsion. Best water-resistance with these additives was obtained by heating the applied emulsion in order to cure the composition fully.

Coatings based on polymers of ethylenically unsaturated esters present additional problems due to the hydrolyzable character of the ester groupings. Polymers of vinyl esters of lower aliphatic acids, particularly those based on vinyl acetate, are highly susceptible to hydrolysis. In some cases, such as with (meth)acrylate esters, this problem has been minimized by copolymerizing a very hydrophobic monomer such as styrene with the ethylenically unsaturated ester monomer. This technique has not been considered useful for the preparation of vinyl acetate copolymers, since as pointed out by Marvel in an Introduction to the Organic Chemistry of High Polymers at page 60, published by John Wiley & Sons, 1959, vinyl acetate does not copolymerize with styrene. However, U.S. Pat. 2,741,650 does describe the post treatment of polyvinyl acetate dispersions with styrene at a temperature of at least 80° C. forming products having a particle size of about 2–4 microns. While this particle size is excellent for the preparation of adhesives, film uses normally require a particle size of less than one micron and preferably less than 0.5 microns. Accordingly, the products of U.S. Pat. 2,741,650 are not particularly suitable for the preparation of films and coatings.

The poor water-resistance of coatings and films deposited from polyvinyl ester dispersions is particularly unfortunate since these coatings impart adhesion and toughness of a type not obtainable with other polymeric materials. While extremely hard surface coatings can be obtained using polymeric emulsions of so-called hard monomers, such as styrene or methyl methacrylate, the hardness of the polymeric material is normally tempered by copolymerization with relatively soft monomers, such as ethyl acrylate or 2-ethylhexyl acrylate, and/or the addition of plasticizers, since the harder the surface coating the more susceptible the coatings are to abrasion. On the other hand, polymeric emulsions of vinyl esters, form extremely tough, abrasion resistant finishes, which are particularly desirable for coating wood or other resilient surfaces. Further, vinyl acetate is markedly less expensive than the commonly used (meth)acrylate ester monomers.

The general object of this invention is to provide polymer emulsions capable of forming tough, abrasion-resistant, water-resistant films. A more specific object of this invention is to provide room temperature curing polymer emulsion compositions capable of forming hard, tough, abrasion-resistant, water-resistant films. Other objects appear hereinafter.

In one aspect this invention is a polymer emulsion capable of forming a tough, abrasion-resistant, water-resistant film comprising a polymer of a vinyl ester of a saturated aliphatic acid, monovinyl aromatic compound and an alpha, beta-ethylenically unsaturated acid.

In a second aspect this invention is a polymer emulsion composition capable of forming a tough, abrasion-resistant, water-resistant film comprising a polyvalent metal compound and a polymer of a vinyl ester of a saturated aliphatic acid, monovinyl aromatic compound and an alpha, beta-ethylenically unsaturated acid.

In a third aspect this invention is an acidic polymer emulsion composition capable of forming at room temperature a tough, abrasion-resistant, water-resistant film comprising a polyvalent metal salt of an organic acid and a polymer of a vinyl ester of a saturated aliphatic acid, monovinyl aromatic compound and an alpha, beta-ethylenically unsaturated acid.

In a fourth aspect this invention is an aqueous alkaline floor polish composition comprising a polymer of a vinyl ester of a saturated aliphatic acid, monovinyl aromatic compound and and an alpha, beta-ethylenically unsaturated acid and an aqueous alkali-insoluble copolymer of from about 2 to 20 percent by weight of an alpha, beta-ethylenically unsaturated carboxylic acid and 80 to 98 percent by weight monovinyl aromatic compound.

In another aspect this invention is a process of preparing a polymer emulsion capable of forming tough, abrasion-resistant, water-resistant film, which comprises polymerizing three essential monomers defined as (A) At least one polymerizable vinyl ester of a saturated aliphatic monocarboxylic acid,
(B) At least one polymerizable monovinyl aromatic monomer and
(C) At least one polymerizable alpha, beta-ethylenically unsaturated acid, in proportions such that 90 to 99.5% by weight monomers (A), (B), and (C) are monomers (A) and (B) in a weight ratio of (A) to (B) in the range of 4:6 to 9:1 and correspondingly, 0.5 to 10% by weight is monomer (C) the polymerization being performed by an aqueous emulsion polymerization reaction, the steps of polymerizing first the entire proportion of monomer (A) and second polymerizing monomer (B), at least one of said stages of polymerization including at least part of monomer (C) and the other stage including any balance of monomer (C), the first polymerization being brought essentially to completion before the second is begun.

As indicated above, the polymers of this invention are formed in a particular way from (A) at least one vinyl ester of a saturated aliphatic acid, (B) at least one monovinyl aromatic compound and (C) at least one polymerizable alpha, beta-ethylenically unsaturated acid. Applied films formed from polymeric emulsions of this invention, particularly those containing a suitable polyvalent metal compound, have a high order of toughness, abrasion-resistance and water-resistance. Of the various monomers, the vinyl ester imparts toughness and abrasion-resistance while the monovinyl aromatic compound imparts water-resistance and hardness, and the acid monomer, by itself, acts as an emulsion stabilizer and leveling aid. When a polyvalent metal compound is included in the emulsion, the polyvalent metal compound and the acid "monomer" co-act to impart additional water-resistance and hardness to the film, particularly at acid pH.

In somewhat greater detail the process by which the polymer emulsions of this invention are produced comprises sequential polymerization of the three essential monomer types in balanced proportions:

(A) At least one polymerizable vinyl ester of a saturated aliphatic acid,
(B) At least one polymerizable monovinylaryl compound and
(C) At least one polymerizable alpha, beta-ethylenically unsaturated acid.

The sequential polymerizations are carried out in the presence of one or more emulsion-forming surface active agents that may be either anionic or non-ionic. Each of the sequential polymerizations is carried out in the presence of a free-radical polymerization catalyst that may be added to the reaction mixture all at one time or otherwise. In the final emulsion 90 to 99.5 parts by weight of each 100 parts by weight of essential monomers (A), (B) and (C) consists of monomer (A) and (B) in a ratio of (A) to (B) in the range of 4:6 to 9:1 and correspondingly 0.5 to 10 parts by weight monomer (C). In the first polymerization step, all monomer (A) is polymerized in the presence of a free-radical catalyst and one or more emulsion-producing surface active agents under conditions to form an aqueous polymer emulsion. After essentially all monomer (A) has been polymerized, monomer (B) is added to the emulsion and polymerized under free-radical conditions. If the first stage polymerization is not brought to completion prior to the addition of monomer (B), the final polymerizate will usually contain unreacted vinyl ester due to the fact that (1) monomer (A) reacts at a much slower rate than monomer (B) and (2) monomer (A) does not add readily to a polymer chain terminated by monomer (B). In other words, monomer (B) acts as a polymerization inhibitor of monomer (A). Monomer (C) can be polymerized completely in either step or part of monomer (C) may be included in both steps. Both polymerizations are at elevated temperature below that at which coagulation occurs.

As monomer (A), the polymerizable vinyl ester of saturated aliphatic carboxylic acid, one can use vinyl formate, vinyl acetate, vinyl chloracetate, vinyl propionate, vinyl butyrate, vinyl pentanoate, vinyl hexanoate, vinyl 2-ethylhexanoate, vinyl octoate, vinyl stearate, etc. As the chain length of the acid moiety of the ester group increases, the susceptibility of the ester group to hydrolysis decreases. In particular the formate group is markedly more susceptible to hydrolysis than any of the other members of this series. Other things being equal, polymers of these monomers also decrease in hardness as the chain length of the acid moiety increases. For these reasons, it is normally preferred to use vinyl esters of saturated carboxylic acids containing from 2 to 3 carbon atoms with best results at the lowest cost being obtained with vinyl acetate.

As monomer (B), the polymerizable monovinyl aromatic compound, there can be used styrene and vinyl toluene, which are preferred and other ring-substituted styrenes such as alkoxy styrenes (e.g. methoxy styrene), alkyl styrene (e.g. ethylstyrene, diethylstyrene, isopropylstyrene), halostyrenes (e.g. 2,5-dichlorostyrene), etc.

As monomer (C), the polymerizable alpha, beta-ethylenically unsaturated acid, one can use monocarboxylic acids (such as acrylic acid, methacrylic acid, crotonic acid), polycarboxylic acids (such as itaconic acid, maleic acid, maleic anhydride, fumaric acid) and half-esters of dicarboxylic acids (such as monomethyl itaconate, monobutyl itaconate, monomethyl maleate). The particular acid monomer or monomers employed depend in part on whether the acid monomer is polymerized with monomer (A) or monomer (B). For example, crotonic acid and itaconic acid respond best when polymerized with monomer (A) while methacrylic acid responds best when polymerized with monomer (B). Usually it is desirable to employ two different acid monomers, one in each step.

As indicated above, the weight ratio of vinyl ester to monovinyl aromatic can range from about 4:6 to 9:1. In general, as the concentration of vinyl ester decreases and monovinyl aromatic compound increases, applied films of the polymer emulsion become progressively more water-resistant and harder. At the same time, the abrasion-resistance and toughness decreases. Within this monomer range, the film properties are well-balanced and unlike most films formed from emulsion polymers, the film can be sanded without shattering the film surface. This is a property not normally exhibited by emulsion polymers. When it is desired to prepare clear films from a polymer composed of only (C) monomer, vinyl acetate and styrene, the vinyl acetate concentration must be twice the styrene concentration. In general best results are obtained using a vinyl acetate to styrene weight ratio of about 2:1 to 6:1.

Monomer (C), the alpha, beta-ethylenically unsaturated acid, comprises from about 0.5 to 10% by weight of monomers (A), (B), and (C). If no acid monomer is employed, the polymeric emulsion tends to lack stability and exhibits poor leveling properties. Further, the addition of a polyvalent metal compound to the polymeric emulsion will not increase the water-resistance of applied films since no carboxyl groups will be available for the polyvalent metal compound to co-act.

While the polymers of this invention must contain at least one of each of the three enumerated essential monomers, additional copolymerizable monomers can be employed in a concentration up to about 67 parts by weight per each 100 parts by weight of total monomers (A), (B) and (C). In other words, other copolymerizable monomers can comprise about 40% by weight of the polymer, while the essential monomers comprise about 60% by weight of the polymer. However, if the monomer contains two ethylenically unsaturated double bonds, it normally should be used in a concentration up to about 10 parts by weight per each 100 parts by weight of monomers (A), (B) and (C).

The additional non-essential monomers can be classified as soft monomers or hard monomers. The terms "hard" and "soft" are used herein in reference to polymers formed from the monomers polymerized alone, in the way that is common in this technology. (See Riddle, "Acrylic Esters," Reinhold, New York 1954, page 58; also Pats. Nos. 2,795,564 and 3,244,655.) Generally speaking, this refers to the "brittle point" of the polymer, i.e. the temperature at which the polymer breaks on flexing. The soft monomers useful in this invention have brittle points of about 20° C. and below. These additional monomers are useful in increasing or decreasing the hardness of applied films prepared from the emulsions of this invention or reducing the film-forming temperature of the polymer emulsion.

For example, polymeric emulsions of this invention composed solely of the aforementioned three essential monomer types, wherein the vinyl ester is vinyl acetate, are incapable of depositing a good continuous film on a substrate at room temperature (i.e. 40–110° F.) in the absence of a coalescing agent. However, the addition of a soft monomer in a concentration of about 20 to 50 parts by weight per 100 parts by weight of monomers (A), (B) and (C) is generally sufficient to render the polymer emulsion film forming at room temperature without the aid of a coalescing agent. Smaller concentrations of soft monomer reduce the amount of required coalescing agent. In general, as the concentration of soft monomer increases, the hardness of the applied coating tends to decrease and the coating becomes more flexible.

On the other hand, hard monomers are useful for increasing the hardness of applied films without sacrificing other desirable properties. For example, when it is desirable to prepare a clear film based on a polymer of vinyl acetate and styrene, the vinyl acetate must be used in a weight ratio of at least two parts vinyl acetate per part styrene. If more styrene is used, the polymeric emulsion is not clear and is best suited for use in pigmented coatings or for coating paper where clear films are not necessary. Harder applied clear films are obtained by replacing part of the vinyl acetate with a hard monomer, such as diethylene glycol dimethacrylate, dimethyl maleate, etc.

Suitable soft monomers include the primary and secondary alkyl esters of acrylic acid containing from about 1 to 8 carbon atoms in the alkyl group (e.g. methyl acrylate, ethyl acrylate, 2-ethylhexyl acrylate, octyl acrylate), primary and secondary alkyl esters of methacrylic acid containing from 4 to 12 carbon atoms in the alkyl group (e.g. butyl methacrylate, isobutyl methacrylate, amyl methacrylate, dodecyl acrylate), primary and secondary dialkyl esters of alpha, beta-ethylenically unsaturated dicarboxylic acids containing a total of at least eight carbon atoms in the alkyl groups (e.g. dibutyl maleate, dibutyl fumarate, dioctyl maleate, dioctyl fumarate, dioctyl itaconate), etc.

Suitable hard monomers include the lower alkyl esters of methacrylic acid containing 1 to 3 carbon atoms in the alkyl group (e.g. methyl methacrylate), tertiary and cycloalkyl esters of alpha, beta-ethylenically unsaturated monocarboxylic acids (e.g. tert. butyl methacrylate, cyclohexyl acrylate), lower alkyl esters of alpha, beta-ethylenically unsaturated dicarboxylic acids (e.g. dimethyl maleate, dimethyl fumarate, dimethyl itaconate), acrylonitrile, polyethyleneglycol dimethacrylates (e.g. dimethacrylate), divinyl-benzene, etc.

In general, the non-essential monomer or monomers can be employed in either polymerization step. With the exception of divinyl benzene and methyl methacrylate, which are preferably polymerized with monomer (B), it is usually preferable to polymerize the other monomers, preferably the alkyl esters of alpha, beta-ethylenically unsaturated carboxylic acids having no free acid groups, with the (A) monomer. When an alkyl ester of an unsaturated acid is included with the (A) monomer, methacrylic acid can be used advantageously in both steps.

The emulsifiers useful for dispersal or emulsification of monomer may be chosen from a wide variety of non-ionic surface active agents and anionic surface active agents particularly anionic surface active agents having a polyoxyethylene chain of at least 5 oxyethylene units. Two or more surface active agents are frequently used, of one or both types. The preferred nonionic surface active agents alkyl or (alkyl phenoxy polyoxyethylene ethanol) are composed of a hydrophobic hydrocarbon portion and a hydrophilic portion. The latter is a chain of 5 to 120 oxyethylene units while the former has an alkyl group of 4 to 18 carbon atoms which may be linked to the oxyethylene chain through the phenoxy group. Generally speaking, as the average length of the hydrocarbon chain in a monomer mixture increases, nonionic surface active agents having a smaller number of oxyethylene groups should be used, i.e., those of greater oil solubility.

The preferred class of anionic surface active agents normally have a hydrophilic anion, hydrophobic cation and a long-chain polyoxyethylene chain of 5 to 120 oxyethylene units, preferably 20–60 oxyethylene units. Typical useful surface active agents of this type are alkali metal salts of alkyl phenoxy polyoxyethylene ethanol sulfate esters having 5 to 120 oxyethylene units and the corresponding alkyl oxyethylene ethanol sulfate esters. In general, the selection of surface active agent (or agents) for the present polymer is the same as for many prior art emulsion polymerization systems.

In emulsion polymerization, the amount of surface active agent or agents required, varies primarily with the concentration of monomers to be handled and to a minor extent with the choice of emulsifier, monomers, portion of monomers and catalysts. Generally, the amount of surface active agent used in the polymerization mixtures will range from about 4 to 10% of the total monomer weight in order to provide polymer emulsions having a particle size less than about 0.5 micron. Lower concentrations in the range of about 1 to 4% by weight can be used. Somewhat the same principles apply in the selection of the amount of surface active agent as in the selection of the surface active agent itself. The proportion must be sufficient to impart the necessary stability, desired rate of polymerization and particle size.

As polymerization catalysts, there may be used one or more of the peroxidic compounds better known to act as free-radical catalysts which have at least some solubility in aqueous solution of the emulsifier or which are soluble only in the monomer phase. Among the useful catalysts for the present type of copolymerization are the presulfates, ammonium sodium and potassium salts, hydrogen peroxide and the perborates. Also useful, are the organic peroxides and hydroperoxides. These include benzoyl peroxide, tertiary butyl hydroperoxide, di-isopropyl benzene hydroperoxide, cumene hydroperoxide, caproyl peroxide, methyl ethyl ketone peroxide, etc. Other free-radical catalysts are also useful, such as azo-diisobutyronitrile and other aliphatic azo compounds of the type having an acyclic azo group and an aliphatic carbon atom on each nitrogen, at least one of which is tertiary. In part, the particular combination of monomers governs the selection of the free-radical catalysts since some monomers respond better to one variety than they do to another.

The amount of peroxidic catalysts required is about proportional to the concentration of monomers used. The usual range is 0.01% to 3% of catalyst with reference to the weight of the monomer mixture. The optimum amount of catalyst is determined in large part by the nature of the particular monomer selected, including impurities (including polymerization inhibitors) which accompany particular monomers.

Frequently a promoter for the catalyst is used to hasten the reaction at a sufficiently low temperature to avoid coagulation. The promoter may be a reducing agent and together with the peroxidic catalyst is frequently referred to as a "redox system." Many examples of such systems are known and the promoters include ascorbic acid, and soluble sulfites, hydrosulfites, sulfoxylates, thiosulfates and bisulfites. Examples of particular promoters are sodium hydrosulfite, sodium metabisulfite, zinc or sodium formaldehyde sulfoxylate, and calcium bisulfite. Polyvalent metal ions are also used in small concentration, particularly ferrous ion in the form of ferrous ammonium sulfate at concentrations of a few parts of ferrous ion per million.

The amount of promoter required varies, as is known, with the free-radical initiator chosen and with the particular promoter. The emulsifying agent also affects somewhat the amount used as does the particular monomers. At the outside, not more than 3% or less than 0.01% is used in these situations. The preferred range of ascorbic acid is at the low end of this range up to about 0.5% while sulfites are used preferably in an amount of 0.2% to 1%.

Copolymerization is best effected below about 95° C. The preferred range is 60 to 80° C., although higher temperatures are permissible. After most of the monomers have been converted to copolymer, temperatures even higher than 95° C. may then be applied. In fact, after most of the monomers have been copolymerized, the resulting emulsion copolymer system can be heated to boiling without breaking the emulsion. During copolymerization the temperature can be controlled in part by the rate at which monomers are supplied and polymerized and/or by applied cooling.

The polymerization process can be carried out batchwise or continuously. It is usually preferable, however, to start with part of the monomers which are to be used and add more monomer as polymerization proceeds. An advantage of gradual or stepwise addition of monomers lies in reaching a high solids content with optimum control and maximum uniformity of product. Additional catalysts or additional components of the redox system may be added as polymerization proceeds, and these can be used to control the speed of reaction to avoid overheating.

In performing the process, it is preferred to make up separate premixtures as follows: (1) a catalyst-emulsifier premixture; (2) a first monomer premixture which contains all monomer (A) and preferably at least part of monomer (C); (3) a second monomer premixture which contains all monomer (B) and the balance of monomer (C). Additional catalyst and/or promoter may be added for the second polymerization step. Also, additional surface active agent may be added, the same as that used in the first step or different.

In the preferred method of performing the reactions, the catalyst-emulsifier solution is prepared in hot water (50 to 85° C.). To this the first monomer premixture is added and polymerization proceeds. The addition takes place over a period of time sufficient to permit the temperature to be controlled throughout the reaction. When the first (vinyl ester) reaction is complete, the second monomer (vinyl aromatic compound) premixture is added. Then additional catalyst and adjuvant are added with a part of the promoter being withheld and added gradually over a period of time to maintain a fairly constant concentration of catalyst throughout the polymerization. The reaction is permitted or forced to go to completion, which is insured (1) by raising the temperature to about 85° C. and/or (2) by the addition of additional catalysts and/or promoter.

In general, the polymer emulsions resulting from the emulsion polymerization of the three enumerated monomer types are acidic because of the proportion of acid comonomer. These polymer emulsions can, if desired, be adjusted to a pH of about 3.5 to 10 with volatile alkali, such as morpholine or ammonium, and/or with polyvalent metal compounds.

As indicated above, films and coatings deposited from the polymer emulsions have markedly better water-resistance than prior art vinyl ester homopolymers or copolymers prepared without a monovinyl aromatic monomer and for the most part can be used in the same manner as conventional vinyl ester homopolymers or copolymers. The excellent water-resistance of films and coatings deposited from the polymer emulsions of this invention (even those not containing a polyvalent metal compound) is of a high order making the subsequent desired removal of an aqueous alkaline floor polish (based on a typical vinyl acetate-styrene-alpha, beta-ethylenically-unsaturated-acid polymer) extremely difficult.

When the emulsion polymer is formulated into a floor polish with the normal concentrations of wax and alkali-soluble resin, the applied polish films upon treatment with a polish stripper instead of dispersing in the polish stripper in the manner desired by floor polish users and manufacturers. Increasing the concentration of alkali-soluble resin in order to improve the removability of the polish has not been a suitable solution since the alkali-soluble resins are quite friable and water-sensitive. When the alkali-soluble resin is used in a sufficient concentration to achieve film dispersion, it leads to undesirable powdering and both water and alkali-sensitivity of the applied polish. The addition of an alkali-insoluble, alkali-dispersible copolymer to the polish decreases the alkali-resistance of the applied polish just enough to make it more amenable to removal with a floor polish stripper without sacrifice of other desirable floor polish properties. Suitable alkali-insoluble, alkali-dispersible polymers, which can be used in a concentration of about 1 to 50 parts by weight, preferably 5 to 25 parts by weight, per 100 parts by weight of vinyl ester-monovinyl aromatic polymer, include copolymers of about 80 to 98 parts by weight monovinyl aromatic monomer with about 2 to 20 parts by weight alpha, beta-ethylenically unsaturated carboxyli acid. The concentration of unsaturated acid in this polymer is dependent in part on the concentration of acid monomer in the vinyl ester-monovinyl aromatic polymer.

The water-resistance of applied films and coatings can be and preferably are further enhanced by incorporating a suitable polyvalent metal compound into the polymer emulsion. Alternatively, the substrate to be coated may be pretreated (prior to application of vinyl ester polymer) or post treated (after application of vinyl ester polymer) with a solution of polyvalent metal compound. Generally speaking, these latter two techniques are less desirable than adding the polyvalent metal compound to the emulsion, since they entail an additional coating step and insolubilization tends to be somewhat inferior.

Polyvalent metal compounds useful in this manner are at least partially soluble in water at the pH at which the polyvalent metal compound is employed. The polyvalent metal compound can be in the form of a salt (including chelates) of an organic acid, a salt of a weak inorganic acid, an oxide, hydroxide, etc. Suitable polyvalent compounds include zinc acetate, zinc caprylate, zinc citrate, zinc formate, zinc isovalerate, zinc lactate, zinc malate, zinc oxalate, zinc propionate, zinc salicylate, basic aluminum acetate, aluminum citrate, aluminum diformate, aluminum formacetate, aluminum triformate, titanium oxalate, zirconium acetate, zirconium lactate, barium acetate, calcium acetate, calcium benzoate, calcium gluconate, calcium lactate, calcium mandelate, calcium prionate, calcium salicylate, calcium succinate, calcium tartrate, magnesium acetate, magnesium acetyl salicylate, magnesium benzoate, dibasic magnesium citrate, magnesium formate, magnesium gluconate, magnesium lactate, magnesium salicylate, strontium acetate, strontium salicylate, lead acetate, lead formate, lead salicylate, cobaltous acetate, cobaltous citrate, cobaltous formate, cobaltous succinate, chromic acetate, chromous oxalate, cupric acetate, cupric gluconate, cupric lactate, disodium zinc chelate of nitrilotriacetic acid disodium zinc chelate of ethylenediaminetetraacetic acid, dipotassium zinc chelate of ethylenediaminetetraacetic acid, disodium calcium chelate of ethylenediaminetetraacetic acid, hexasodium zinc chelate of di-(ethylenediaminetetraacetic acid), disodium cadmium chelate of ethylenediaminetetrapropionic acid, disodium zinc chelate of ethylenediaminetetrapropionic acid, zinc chelate of ethylenediaminedi-(hydroxyethyl)-diacetic acid, trisodium zinc chelate of diethylenetriamine pentaacetic acid, disodium zinc chelate of diamine-cyclohexanetetraacetic acid, disodium zirconium chelate of ethylenediaminetetraacetic acid, ammonium zirconium chelate of nitrilotriacetic acid, zirconium chelate of ethylenediamine-(hydroxyethyl)triacetic acid, ammonium zirconyl carbonate, calcium hydroxide, barium hydroxide, strontium hydroxide, magnesium hydroxide, aluminum hydroxide, magnesium oxide, etc.

As indicated above, one of the objects of this invention is the provision of a room temperature curing composition capable of forming hard, tough, abrasion-resistant, water-resistant films and coatings. Compositions suitable for attaining this object are acidic (pH 3 to 7.0) aqueous emulsions comprising a polyvalent metal salt (including chelates) of an organic acid and the above described polymer of a vinyl ester, monovinyl aromatic compound and alpha, beta-ethylenically unsaturated acid. This is in direct contrast to the typical aqueous emulsion polymer systems, which are generally applied from an alkaline medium, such as in paints, paper coating adhesives, floor polishes, clear finishes, etc. The acidic system (polymer and polyvalent metal salt) cure completely when applied at room temperature while heat is necessary in order to obtain complete cure with aqueous alkaline emulsions (polymer and polyvalent metal compound). In spite of this, coatings applied at room temperature from these aqueous acidic emulsions polymer systems are markedly more water-resistant than heat cured or fused coatings applied from aqeuous alkaline emulsion polymer systems of this invention.

The preferred polyvalent metal salts of an organic acid suitable for use in the aqueous acidic emulsion polymer systems are the colorless salts. Best results have been obtained using salts of zirconium zinc, cadmium and aluminum, preferably the acetates. Of these zirconium acetate is particularly preferred with zinc acetate being next. Other things being equal, films prepared at room temperature from emulsions containing half as much as zirconium acetate as zinc acetate are slightly more water-resistant. The polyvalent metal salt of an organic acid can comprise from about 1 to 100 parts by weight (preferably 1 to 10 parts by weight) per 100 parts by weight emulsion polymer solids. However, as indicated, the optimum concentration varies to some extent with the particular polyvalent metal salt.

The polymer emulsions resulting from the emulsion polymerization of the three essential monomers are preferably adjusted to a pH of 3.5 to 7 for use in the acidic room temperature curing systems by the addition of volatile alkali, such as morpholine or ammonia and/or a polyvalent metal salt of an organic acid. Many of the polyvalent metal salts of organic acid, in accordance with this invention, serve well to buffer the emulsion in the preferred pH range of 3.5 to 7. For example, zinc acetate solutions in water have a pH of 6.2 to 6.7 depending on concentration. If the polymer emulsion has a pH more than 7.0, it may be adjusted to below 7 with a suitable acid (e.g. hydrochloric acid, acetic acid, sulfuric acid) or with an acid metal salt (e.g. zinc chloride or ammonium chloride).

Generally, the polyvalent metal salts are dispersed or disssolved in water prior to their addition to the polymer emulsion. The solution or dispersion can then be added hot or cold. There is rarely any need to adjust the pH of polyvalent metal dispersion because their aqueous solutions buffer in the desired pH range. The addition of the polyvalent-metal organic-acid salt to the polymer emulsion seems to affect the emulsion as if the particle size of the polymer had increased. The final product may be filtered to remove coagulated polymer if desired.

The characteristics of dried films are improved by the addition of various additives to the acidic polymer emulsion which contain polyvalent metal salt of an organic acid. For example, the preferred polymeric materials of this invention are not film-forming at room temperature and require the presence of suitable plasticizer or coalescing agent to permit their use in room temperature curing systems. In particular, additives which are commonly used as leveling agents, softeners (plasticizer) and coalescing agents in floor polishes, such as methyl Carbitol, ethyl Carbitol, butyl Carbitol, tributoxy-ethylphosphate, pyrrolidone, methylpyrrolidone, fluorinated compounds of U.S. Pat. No. 2,937,098, such as FC-134 sold by Minnesota Mining and Manufacturing, etc. can be used in a concentration of from about 0.5 to 100 parts by weight (preferably 1 to 10 parts by weight) per 100 parts by weight of emulsion polymer solids.

As indicated above, this invention also contemplates aqueous alkaline systems comprising a polyvalent metal compound and polymer of vinyl ester, monovinyl aromatic compound and alpha, beta-ethylenically unsaturated acid. The preferred polyvalent metal compounds for use in alkaline emulsion polymer systems are the colorless salts. Best results have been obtained with salts of zirconium, zinc, cadmium and aluminum, preferably the acetates and/or the alkali metal polyvalent metal chelates of alkylene-polyamine polycarboxylic acids containing on an average at least 1.5 alkali metal groups per molecule. Ammonium zirconyl carbonate has also been effective. While optimum cure is obtained with these systems by heating at from about 100 to 150° C. for a short time, less than complete cure can be obtained by applying at room temperature and permitting the composition to dry without heating. Films or coatings prepared without heat cure or fusion develop greater water-resistance after aging than do comparable compositions which do not contain a polyvalent metal compound. The polyvalent metal compound can comprise from 1 to 100 parts by weight (preferably 1 to 10 parts by weight) per 100 parts by weight emulsion polymer solids with the optimum concentration depending in part on the particular polyvalent metal salt. In some cases, where uncomplexed polyvalent metal salts are added at a pH of about 7 to 12, the polyvalent metal salt may form a precipitate. This precipitate can be redispersed or redissolved by making the system somewhat more alkaline.

When the aqueous alkaline polyvalent metal emulsion polymer system contains an alkali-soluble resin, such as in floor polish or paint compositions, the polyvalent metal compound is preferably added in the form of a chelate. In this way, as explained in detail in commonly assigned copending application Ser. No. 541,095 whose complete disclosure is incorporated by reference, alkali-soluble resin is not precipitated from the polish prior to its application to the flooring.

On the surface, it may appear incongruous to add a polyvalent metal compound to an alkaline floor polish to increase the water-resistance of the applied polish, since it has been indicated earlier that the vinyl ester-vinyl aromatic polymers are relatively difficult to remove from a substrate unless a suitable alkali-insoluble, alkali-dispersible polymer is added to the polish. The polyvalent metal chelates function in floor polish in essentially the same manner as that described in Ser. No. 541,095, filed Apr. 8, 1966 and now U.S. Pat. No. 3,457,208, to impart detergent-resistance to the applied polish. In other words the applied polish can be washed with detergents or soaps without removing, dulling or water spotting the polish surface. The water-resistance imparted by the polyvalent metal compound is of a different order. At the same time the polish is susceptible of complete removal with a suitable ammoniacal cleaner.

The coating compositions of this invention can be applied to all sorts of surfaces for a wide variety of purposes. They are particularly desirable for use in presealing and finishing plywood and masonite; coating vinyl and wood resilient flooring; overprint varnishes; ceramic tile sealers, acid highway and industrial paints; paper and textile coatings with and without starch; tape release coatings; paper stiffeners; metal coatings; paper pigment binders; rug backing; metal coatings, alkaline paints, etc.

The compositions can be pigmented or augmented with dye if clear coatings are not desired. For this purpose there may be incorporated into the coating composition an amount of pigment, extender, filler, delustrant, fire retardant ($Sb_2O_3$) or the like, such that the weight ratio of binder solids to pigment is 99 to 1 to 1 to 20 depending upon the particular effect desired. Any non-reactive water-insoluble pigment may be employed including titanium dioxide, ultramarine blue, barium sulfate, calcium carbonate, zinc chromate, carbon black, etc.

The following examples are merely illustrative and should not be construed as limiting the scope of the invention.

EXAMPLE I

The followed premixtures were prepared to be used in the preparation of a preferred polymer of this invention, particularly suitable for use as a clear wood finish.

| | Parts dry weight |
|---|---|
| Emulsifier premixture: | |
| Sodium salt of lauryl polyethoxysulfate $C_{12}H_{25}$—$(OCH_2$—$CH_2)_{50}$—$OSO_3Na$ | 5.5 |
| Water | 118.25 |
| First monomer premixture: | |
| Vinyl acetate | 70.0 |
| Ethylene glycol dimethacrylate | 1.0 |
| Second monomer premixture: | |
| Itaconic acid | 0.5 |
| Water | 10.0 |
| First catalyst premixture: | |
| Ammonium persulfate | 0.4 |
| Water | 10.0 |
| First promoter premixture: | |
| Sodium metabisulfite | 0.2 |
| Water | 10.0 |
| Third monomer premixture: | |
| Styrene | 27.5 |
| Methacrylic acid | 1.0 |
| Second catalyst premixture: | |
| t-Butyl hydroperoxide | 0.1 |
| Water | 1.0 |
| Second promoter premixture: | |
| Ascorbic acid | 0.04 |
| Water | 5.0 |

The emulsifier premixture was prepared in hot water (70°–72° C.) in a suitable glass-lined reactor fitted with a stirrer and jacket. Five percent by weight of the first monomer premixture and five percent by weight of the first catalyst premixture were added to the reactor, which was maintained at about 70–72° C. About ten minutes later the gradual addition of the first promoter premixture was begun. The promoter was added over a period of about two and one-half hours while maintaining the exothermic reaction at between 70 to 75° C. About ten minutes after the gradual addition of the first promoter was begun, there was begun the gradual additions over a period of about two hours of (1) the remainder of the first monomer premixture, (2) the second monomer premixture and (3) the remainder of the first catalyst premixture. The reaction mixture was maintained at about 70–75° C. for about one-half to two hours after the first promoter addition was completed in order to insure that essentially all the vinyl acetate was polymerized. While still maintaining the reaction mixture at 70–75° C., the third monomer premixture and second catalyst premixture were added gradually over a thirty minute period while the second promoter premixture was added over a one hour period. The reaction mixture was then adjusted to about 78° C. and maintained there for one hour in order to complete the polymerization. The resulting 40% by weight emulsion had essentially no coagulum.

EXAMPLE II

A clear, acidic (pH 4.2) room-temperature curing coating composition was prepared from the polymer emulsion of Example I by mixing 265.8 parts by weight of the emulsion polymer (40% dry solids or 106.24 parts dry weight) with 4.52 parts methyl Carbitol in 4.52 parts by weight water and 2.34 parts by weight of zirconium acetate in 8.29 parts by weight water. The 38% solids composition was brushed onto oak and mahogany panels. After drying for thirty minutes at room temperature, the coated side of the wood paneling was sanded lightly and recoated with a second coat of the coating composition forming matte finishes.

A glossy clear finish was obtained by recoating the sanded surface with a clear coating composition based upon Ubatol 7001, a styrene-acrylate emulsion.

EXAMPLE III

Example II was repeated with essentially the same results except that 4.68 parts by weight zinc acetate was used instead of 2.34 parts by weight zirconium acetate.

EXAMPLE IV

A clear alkaline coating composition was prepared from the polymer emulsion of Example III by adjusting the pH of the emulsion polymer-zinc acetate-methyl Carbitol composition to pH 12 with ammonium hydroxide. The composition was brushed onto oak panels, dried and cured at 250° F. for fifteen minutes. While the coated side of the panel had a relatively hard, clear surface, it could not be sanded.

Alkaline compositions of this type should be adjusted to a sufficiently alkaline pH to resolubilize the polyvalent metal complex prior to application to the substrate.

EXAMPLE V

Example II was repeated with essentially the same results using a polymer prepared in the same manner as that described in Example I except that the 27.5 parts by weight styrene was replaced by 27.5 parts by weight vinyl toluene.

EXAMPLE VI

This example illustrates the preparation of a polymer of this invention particularly suitable for use in floor polishes. The process described in Example I was repeated using the premixtures set forth below.

| Emulsifier premixture: | Parts dry weight |
|---|---|
| Sodium salt of lauryl polyethoxysulfate $C_{12}H_{25}$—$(OCH_2$—$CH_2)_{50}$—$OSO_3Na$ | 4.0 |
| Tergitol NP–44 | 1.0 |
| Water | 88.45 |
| First monomer premixture: | |
| Vinyl acetate | 65.0 |
| Second monomer premixture: | |
| Itaconic acid | 0.5 |
| $C_{12}H_{25}$—$(OCH_2$—$CH_2)_{50}$—$OSO_3Na$ | 0.5 |
| Water | 21.41 |
| First catalyst premixture: | |
| Ammonium persulfate | 0.4 |
| Water | 15.0 |
| First promoter premixture: | |
| Sodium bisulfite | 0.2 |
| Water | 10.0 |
| Third monomer premixture: | |
| Styrene | 32.5 |
| Methacrylic acid | 2.0 |
| Second catalyst premixture: | |
| t-Butyl hydroperoxide | 0.1 |
| Water | 1.0 |
| Second promoter premixture: | |
| Ascorbic acid | 0.04 |
| Water | 15.0 |

The resulting 40% solids emulsion had essentially no coagulum.

EXAMPLE VII

Eighty parts by weight of the 40% solids polymer latex of Example VI was mixed with 20 parts by weight of a 40% solids alkali-insoluble, alkali-dispersible emulsion copolymer of 90 parts by weight styrene and 10 parts by weight methacrylic acid. The polymer blend was diluted to 15% solids and adjusted to pH 7.5. Seventy parts by weight of this blend was then compounded with 15 parts by weight of a 15% solids aqueous solution of an alkali-soluble resin copolymer of styrene and propyl hydrogen maleate, 15 parts by weight of a 15% solids polyethylene emulsion, prepared by mixing 100 parts by weight polyethylene, 20 parts by weight oleic acid, 20 parts by weight morpholine and 660 parts by weight water, 0.5 part by weight tributoxyethyl phosphate, 1 part by weight dibutyl phthalate and 0.5 part by weight cationic surface active agent having a long fluorocarbon group and a solubilizing organic group (FC-134) (1% by weight solids) with good agitation. The polish was adjusted to pH 7.5 with ammonium hydroxide.

The polish was applied to various substrates and compared with polishes formulated from Ubatol 2001 styrene emulsion in the recommended manner. The polish of this invention was fully equivalent to the polish prepared from Ubatol 2001 in all particulars except that the polish of this invention was less prone to powdering, was more resistant to black heel marking and was more susceptible to recoating.

Essentially the same results were obtained by varying the weight ratio of vinyl acetate-styrene polymer to alkali-insoluble, alkali-dispersible polymer to 85:15 and 90:10. Each of the applied polishes of this invention dispersed in the desired manner upon the application of commercial strippers. However, when the vinyl acetate-styrene polymer was used without any alkali-insoluble, alkali-dispersible polymer the applied polymer did not disperse properly on the application of a stripper and the applied polish was somewhat softer.

EXAMPLE VIII

This example illustrates the preparation of a polymer latex of this invention, which is film forming at room temperature in the absence of coalescing agents and which is particularly suitable for use as a vehicle for paints or for forming rug backings. The process described in Example I was repeated using the premixtures set forth below.

| Emulsifier premixture: | Parts dry weight |
|---|---|
| $C_{12}H_{25}$—$(OCH_2CH_2)_{50}$—$OSO_3Na$ | 4.0 |
| Igepol CO–890 | 2.0 |
| Water | 87.04 |
| First monomer premixture: | |
| Vinyl acetate | 60.0 |
| Dibutyl maleate | 25.0 |
| Second monomer premixture: | |
| Itaconic acid | 0.5 |
| Water | 15.0 |
| First catalyst premixture: | |
| Ammonium persulfate | 0.4 |
| Water | 15.0 |
| First promoter premixture: | |
| Sodium metabisulfite | 0.10 |
| Water | 15.0 |
| Third monomer premixture: | |
| Styrene | 13.5 |
| Methacrylic acid | 1.0 |
| Second catalyst premixture: | |
| t-Butyl hydroperoxide | 0.5 |
| Water | 1.0 |
| Second promoter premixture: | |
| Ascorbic acid | 0.01 |
| Water | 3.0 |

The resulting 46% solids emulsion had essentially no coagulum.

EXAMPLE IX

A polymer emulsion having a relatively high concentration of styrene was prepared in the manner described in Example I by decreasing the vinyl acetate concentration in the first monomer premixture to 50 parts by weight and increasing the styrene concentration in the third monomer premixture to 48 parts by weight.

EXAMPLE X

This example illustrates the preparation of a room temperature film-forming polymer latex containing vinyl acetate and vinyl stearate units. The following premixtures were polymerized in essentially the manner described in Example I.

| Emulsifier-catalyst premixture: | Parts dry weight |
|---|---|
| Sodium lauryl sulfate | 1.5 |
| Tergitol NPX | 1.0 |
| Sodium lauryl ether sulfate | 0.5 |
| Doxad 30 (sodium salt of a polyelectrolyte) | 0.5 |
| Potassium persulfate | 0.4 |
| Water | 87.02 |
| Combined first and second monomer premixture: | |
| Vinyl acetate | 40.0 |
| Vinyl stearate | 5.0 |
| Ethyl acrylate | 25.0 |
| Methacrylic acid | 1.5 |
| First promoter premixture: | |
| Ascorbic acid | 0.03 |
| Water | 5.0 |

| Third monomer premixture: | Parts dry weight |
|---|---|
| Styrene | 25.0 |
| Methacrylic acid | 3.0 |
| Second catalyst premixture: | |
| Tert-butyl hydroperoxide | 0.06 |
| Second promoter premixture: | |
| Ascorbic acid | 0.03 |
| Water | 5.0 |

The 50% total solids emulsion had essentially no coagulum and when applied at room temperature to a glass plate the coating coalesced forming a flexible, clear coating with slight surface haze.

EXAMPLE XI

This example illustrates the preparation of a polymer of this invention suitable for use as a clear wood finish containing a cross-linking monomer in both polymerization steps. The following premixtures were polymerized in essentially the manner described in Example I:

| Emulsifier premixture: | Parts dry weight |
|---|---|
| Sodium salt of lauryl polyethoxysulfate $C_{12}H_{25}$—$(OCH_2$—$CH_2)_{50}$—$OSO_3Na$ | 5.5 |
| Water | 77.3 |
| First monomer premixture: | |
| Vinyl acetate | 66.5 |
| Dimethyl maleate | 6.0 |
| Ethylene glycol dimethacrylate | 1.0 |
| Second monomer premixture: | |
| Itaconic acid | 0.5 |
| Water | 10.0 |
| First catalyst premixture: | |
| Ammonium persulfate | 0.3 |
| Water | 10.0 |
| First promoter premixture: | |
| Sodium metabisulfite | 0.1 |
| Water | 10.0 |
| Third monomer premixture: | |
| Styrene | 12.0 |
| Methyl methacrylate | 12.0 |
| Divinyl benzene | 0.2 |
| Second catalyst premixture: | |
| t-Butyl hydroperoxide | 0.1 |
| Water | 1.0 |
| Second promoter premixture: | |
| Ascorbic acid | 0.04 |
| Water | 4.0 |

The resulting 48% by weight emulsion had essentially no coagulum.

Since many embodiments of this invention may be made and since many changes may be made in the embodiments described the foregoing is to be interpreted as illustrative only and our invention is defined by the claims appended hereto.

We claim:

1. An alkaline polymer emulsion capable of forming a tough, abrasion-resistant, water-resistant film comprising at least one surface active agent selected from the group consisting of nonionic and anionic surface agents, a polyvalent metal compound, a polymer of
   (A) at least one vinyl ester of a saturated aliphatic monocarboxylic acid,
   (B) at least one polymerizable monovinyl aromatic monomer, and
   (C) at least one alpha, beta-ethylenically unsaturated acid,
in proportions such that monomers (A), (B) and (C) comprise at least 60% by weight of the polymer, 90 to 99.5% by weight of monomers (A), (B) and (C) are monomers (A) and (B) in a weight ratio of (A) to (B) in the range of 4:6 to 9:1 and correspondingly 0.5 to 10% by weight is monomer (C), an alkali-soluble resin, and alkali-dispersible copolymer of about 80 to 98 parts by weight monovinyl aromatic monomer and 2 to 20 parts by weight alpha, beta-ethylenically unsaturated carboxylic acid, wherein said polyvalent metal compound is present in a concentration of from 1 to 100 parts by weight per 100 parts by weight of said polymer of monomers (A), (B) and (C) and said alkali-insoluble, alkali-dispersible copolymer is present in a concentration of about 1 to 50 parts by weight per 100 parts by weight of said polymer of monomers (A), (B) and (C).

2. The polymer emulsion of claim 1 wherein the weight ratio of monomers (A) to (B) is in the range of 2:1 to 6:1.

3. The polymer emulsion of claim 1, wherein said polymer of monomers (A), (B) and (C) is not film forming at room temperature in the absence of a coalescing agent.

4. The polymer emulsion of claim 3, wherein said composition comprises a coalescing agent in a concentration sufficient to make said polymer emulsion film-forming at room temperature.

5. The polymer emulsion of claim 3, wherein said composition is alkaline and comprises a soluble polyvalent metal chelate of an alkylenepolyaminepolycarboxylic acid.

6. The polymer emulsion of claim 1, wherein the vinyl ester of a saturated aliphatic acid is vinyl acetate.

7. The polymer emulsion of claim 1, wherein the monovinyl aromatic compound is styrene.

8. An alkaline polymer emulsion capable of forming a tough, abrasion-resistance, water-resistance film comprising at least one surface active agent selected from the group consisting of nonionic and anionic surface agents, a polyvalent metal compound, a polymer of
   (A) vinyl acetate
   (B) styrene
   (C) at least one alpha, beta-ethylenically unsaturated acid,
in proportions such that monomers (A), (B) and (C) comprise at least 60% by weight of the polymer, 90 to 99.5% by weight of monomers (A), (B) and (C) are monomers (A) and (B) in a weight ratio of (A) to (B) in the range of 2:1 to 6:1 and correspondingly 0.5 to 10% by weight is monomer (C), an alkali-soluble resin, and an alkali-dispersible copolymer of about 80 to 98 parts by weight monovinyl aromatic monomer and 2 to 20 parts by weight alpha, beta-ethylenically unsaturated carboxylic acid, wherein said polyvalent metal compound is present in a concentration of from 1 to 100 parts by weight per 100 parts by weight of said polymer of monomers (A), (B) and (C) and said alkali-insoluble, alkali-dispersible copolymer is present in a concentration of about 1 to 50 parts by weight per 100 parts by weight of said polymer of monomers (A), (B) and (C).

9. An acidic polymer emulsion capable of forming at room temperature a tough, abrasion-resistant, water-resistant film comprising at least one surface active agent selected from the group consisting of nonionic and anionic surface active agents, a polyvalent metal salt of an organic acid and a polymer of
   (A) at least one vinyl ester of a saturated aliphatic monocarboxylic acid,
   (B) at least one polymerizable monovinyl aromatic monomer, and
   (C) at least one alpha, beta-ethylenically unsaturated acid,
in proportions such that monomers (A), (B) and (C) comprise at least 60% by weight of the polymer, 90 to 99.5% by weight of monomers (A), (B) and (C) are monomers (A) and (B) in a weight ratio of (A) to (B) in the range of 4:6 to 9:1 and correspondingly 0.5 to 10% by weight is monomer (C), wherein said polyvalent metal salt of an organic acid is present in a concentration from 1 to 100 parts by weight per 100 parts by weight of polymer solids.

10. The polymer emulsion of claim 9, wherein said polyvalent metal compound is a salt of a metal selected from the group consisting of zinc, zirconium, cadmium and aluminum.

11. The polymer emulsion of claim 9, wherein said polymer of monomers (A), (B) and (C) is not film-forming at room temperature in the absence of a coalescing agent and said polymer emulsion contains a coalescing agent in a concentration sufficient to make said polymer emulsion film-forming at room temperature.

12. The polymer emulsion of claim 11, wherein the weight ratio of monomer (A) to (B) is in the range of 2:1 to 6:1.

13. An acidic polymer emulsion capable of forming at room temperature a tough, abrasion-resistant, water-resistant film comprising at least one surface active agent selected from the group consisting of nonionic and anionic surface active agents, a polyvalent metal salt of an organic acid and a polymer of
   (A) vinyl acetate
   (B) styrene, and
   (C) at least one polymerizable alpha, beta-ethylenically unsaturated acid,
in proportions such that monomers (A), (B) and (C) comprise at least 60% by weight of the polymer, 90 to 99.5% by weight of monomers (A), (B) and (C) are monomers (A) and (B) in a weight ratio of (A) to (B) in the range of 2:1 to 6:1 and correspondingly 0.5 to 10% by weight is monomer (C), said polymer not being film-forming at room temperature in the absence of a coalescing agent, wherein said polyvalent metal salt of an organic acid is present in a concentration from 1 to 100 parts by weight per 100 parts by weight of polymer solids.

14. The composition of claim 13, wherein said composition comprises a coalescing agent in a concentration sufficient to make said composition film-forming at room temperature.

15. The composition of claim 13, wherein said polyvalent metal salt is zirconium acetate.

16. The composition of claim 13, wherein said polyvalent metal salt is zinc acetate.

References Cited

UNITED STATES PATENTS

| 2,754,280 | 7/1956 | Brown et al. | 260—29.6 M |
| 2,958,673 | 11/1960 | Jen | 260—885 X |
| 3,234,158 | 2/1966 | Pfluger et al. | 260—29.6 RW |
| 3,247,174 | 4/1966 | Breitenbach et al. | 260—886 |
| 3,328,325 | 6/1967 | Zadanowski | 260—28.5 X |
| 3,403,119 | 9/1968 | Sullivan et al. | 260—28.5 |

FOREIGN PATENTS

| 838,943 | 6/1960 | Great Britain | 260—29.6 RW |
| 860,677 | 2/1961 | Great Britain. | |

SAMUEL H. BLECH, Primary Examiner

H. ROBERTS, Assistant Examiner

U.S. Cl. X.R.

117—148, 155 UA, 161 UT; 260—28.5 R, 29.6 NR, RW, WB, 30.2, 30.6 R, 33.2 R, 41 B, 874, 876 R, 885, 886